United States Patent
Hashimoto et al.

(10) Patent No.: US 8,552,612 B2
(45) Date of Patent: Oct. 8, 2013

(54) STATOR CORE AND METHOD OF MANUFACTURING SAME

(75) Inventors: Akihiro Hashimoto, Kitakyushu (JP); Yusuke Hasuo, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 0 days.

(21) Appl. No.: 13/377,413

(22) PCT Filed: Jul. 8, 2010

(86) PCT No.: PCT/JP2010/061626
§ 371 (c)(1),
(2), (4) Date: Dec. 9, 2011

(87) PCT Pub. No.: WO2011/030611
PCT Pub. Date: Mar. 17, 2011

(65) Prior Publication Data
US 2012/0086302 A1 Apr. 12, 2012

(30) Foreign Application Priority Data
Sep. 9, 2009 (JP) ................................. 2009-208352

(51) Int. Cl.
*H02K 1/06* (2006.01)
*H02K 1/18* (2006.01)
*H02K 1/14* (2006.01)

(52) U.S. Cl.
USPC ...... 310/216.057; 310/216.018; 310/216.044; 310/216.058; 310/216.113; 310/216.009

(58) Field of Classification Search
USPC .................... 310/216.113, 216.004, 216.009, 310/216.057, 216.058
IPC ................................. H02K 1/06,1/14
See application file for complete search history.

(56) References Cited

U.S. PATENT DOCUMENTS 3,886,383 A * 5/1975 Ross et al. ................. 310/12.09
5,539,974 A 7/1996 Isayama
(Continued)

FOREIGN PATENT DOCUMENTS

JP 63-080741 A 4/1988
JP 7-007895 A 1/1995
(Continued)

OTHER PUBLICATIONS

International Search Report of PCT/JP2010/061626, mailing date Sep. 14, 2010.

*Primary Examiner* — Terrance Kenerly
(74) *Attorney, Agent, or Firm* — Westerman, Hattori, Daniels & Adrian, LLP

(57) ABSTRACT

A stator core 10 and its manufacturing method, the stator core 10 including laminated stator core sheets 17, each of the stator core sheets 17 punched out from a magnetic metal sheet 32, a central portion of the magnetic metal sheet 32 previously punched out to form a rotor core sheet 36, the stator core 10 including a thin section 24 formed in a magnetic pole piece 19 of each of the stator core sheets 17, the thin section 24 formed by pressing both sides of the magnetic pole piece 19 in a thickness direction and radially-inwardly elongating the magnetic pole piece 19. The present invention prevents the magnetic pole piece 19 from being curved and improves interlocking accuracies and dimensional accuracies in blanking the rotor core sheet 36 and the start core sheet 17 from one magnetic metal sheet 32.

4 Claims, 6 Drawing Sheets

(56) References Cited

U.S. PATENT DOCUMENTS

| | | |
|---|---|---|
| 2001/0015589 A1* | 8/2001 | Sakagami et al. ............ 310/217 |
| 2002/0114824 A1* | 8/2002 | Fukui et al. .................. 424/432 |
| 2007/0013255 A1* | 1/2007 | Wakitani et al. ............. 310/216 |
| 2009/0083964 A1 | 4/2009 | Tokizawa |
| 2009/0195110 A1* | 8/2009 | Miyake et al. ......... 310/216.058 |
| 2011/0127876 A1* | 6/2011 | Hasuo et al. ........... 310/216.004 |
| 2011/0154650 A1* | 6/2011 | Hashimoto .................... 29/598 |
| 2011/0241460 A1* | 10/2011 | Mebarki et al. ................. 310/64 |

FOREIGN PATENT DOCUMENTS

| | | |
|---|---|---|
| JP | 8-149761 A | 6/1996 |
| JP | 10-322980 A | 12/1998 |
| JP | 2955804 B2 | 10/1999 |
| JP | 2005-185081 A | 7/2005 |
| JP | 2009-089482 A | 4/2009 |

* cited by examiner

STATOR CORE AND METHOD OF MANUFACTURING SAME

TECHNICAL FIELD

The present invention relates to a stator core made of a strip material (e.g., magnetic metal sheet) with high yield and productivity, and further relates to a method of manufacturing the stator core. For example, the stator core is used for a stepping motor.

BACKGROUND ART

Conventionally, a laminated core for a stepping motor has a very small air gap between a rotor core and a stator core. Thus, scrap pieces between a rotor core sheet and a stator core sheet have narrow widths. The scrap pieces may be broken during a punching operation and not drop downwardly into a die of a die device. In such a case, the punching operation has to be repeated. In addition, the die device may be damaged due to clogging of the scrap pieces. Furthermore, if outside teeth of the rotor core sheet and inside small teeth of the stator core sheet cannot be blanked from one strip material in desired shapes, the rotor core sheet and the stator core sheet need to be blanked separately with different die devices, which results in a low material yield and a high cost.

To solve the above problems, for example, Patent Document 1 discloses conventional art capable of blanking the rotor core sheet and the stator core sheet from one strip material with one die device by providing a thin section in at least one of the rotor core sheet and the stator core sheet. The thin section is formed by coining and flattening a surface of the rotor (or stator) core sheet in a thickness direction.

PRIOR ART DOCUMENT

Patent Document

[Patent Document 1] Japanese Patent No. 2955804

SUMMARY OF INVENTION

Problems to be Solved by the Invention

In a process of forming the thin section according to Patent Document 1, particularly when a tip of the magnetic pole piece is elongated radially inward, a magnetic pole piece is coined from one side in a thickness direction and thus curved. The curved magnetic pole piece has to be straightened in a succeeding process for forming interlocking portions. For this reason, interlocking accuracies and dimensional accuracies of an inner diameter of the core are not stabilized. Furthermore, if the magnetic pole piece is pressed strongly to increase the elongation, the magnetic pole piece is curved largely, adversely affecting qualities of the core.

The present invention has been made in view of the above circumstances and has an object to provide a stator core and a method of manufacturing the same, capable of elongating a magnetic pole piece without bending it during the formation of a thin section and thus improving interlocking accuracies and dimensional accuracies in blanking a rotor core sheet and a start core sheet from one magnetic metal sheet.

Means for Solving Problems

To accomplish the above object, a first aspect of the present invention provides a stator core including laminated stator core sheets, each of the stator core sheets punched out from a magnetic metal sheet, a central portion of the magnetic metal sheet previously punched out to form a rotor core sheet, the stator core comprising: a thin section formed in a magnetic pole piece of each of the stator core sheets, the thin section formed by pressing both sides of the magnetic pole piece in a thickness direction and radially-inwardly elongating the magnetic pole piece.

In the stator core according to the first aspect of the present invention, it is preferable that the thin section is formed by pressing one portion of the magnetic pole piece from both sides in the thickness direction. It is further preferable that the thin section has grooves formed in the both sides of the magnetic pole piece in the thickness direction, the grooves having the same cross-sectional shape.

Further in the stator core according to the first aspect of the present invention, the cross-sectional shape of the groove of the thin section may be a rectangular, and the cross-sectional shape of the bottom of the groove of the thin section may be a circular arc. The term rectangular indicates a regular tetragon, a square having rounded corners, etc.

A second aspect of the present invention provides a method of manufacturing a stator core including a step of laminating stator core sheets, each of the stator core sheets punched out from a magnetic metal sheet, a central portion of the magnetic metal sheet previously punched out to form a rotor core sheet, the method comprising the steps of: pressing one portion or different portions of the magnetic pole piece of the stator core sheet from both sides in a thickness direction to form a thin section; and radially-inwardly elongating the magnetic pole piece by a predetermined length. The presswork from both sides in the thickness direction may be done once or multiple times.

In the method of manufacturing the stator core according to the second aspect of the present invention, the thin section may be formed by pressing multiple times one or different portions of the magnetic pole piece from the both sides in the thickness direction.

Further in the method of manufacturing the stator core according to the second aspect of the present invention, it is preferable that the thin section is formed in a straight piece of the magnetic pole piece.

Effect of the Invention

In the stator core and the method of manufacturing the same according to the present invention, the thin section is formed by coining (one or different portions of) the magnetic pole piece of the stator core sheet from both sides in the thickness direction and elongating the magnetic pole piece radially inward. Unlike the conventional art, it is not necessary to coin the magnetic pole piece deeply from one side in the thickness direction using a punch. Therefore, the bending of the magnetic pole piece can be prevented, and the interlocking accuracies and the dimensional accuracies in blanking the rotor core sheet and the start core sheet from one magnetic metal sheet can be improved.

In the process of forming the thin section, pressing both sides of the magnetic pole piece in the thickness direction enables the magnetic pole piece to be elongated longer in a radially inward direction without changing the magnetic characteristics, compared to pressing one side thereof. Furthermore, the magnetic pole piece pressed from both sides in the thickness direction obtains the same elongation as the one pressed from one side and the improved magnetic characteristics.

BRIEF DESCRIPTION OF DRAWINGS

FIG. 2 (B) is a cross-sectional view taken along line A-A of the stator core sheet.

FIGS. 4 (B) to 4 (D) are explanatory views of cross-sectional shapes of grooves according to modifications.

MODE FOR CARRYING OUT THE INVENTION

Figure 1:
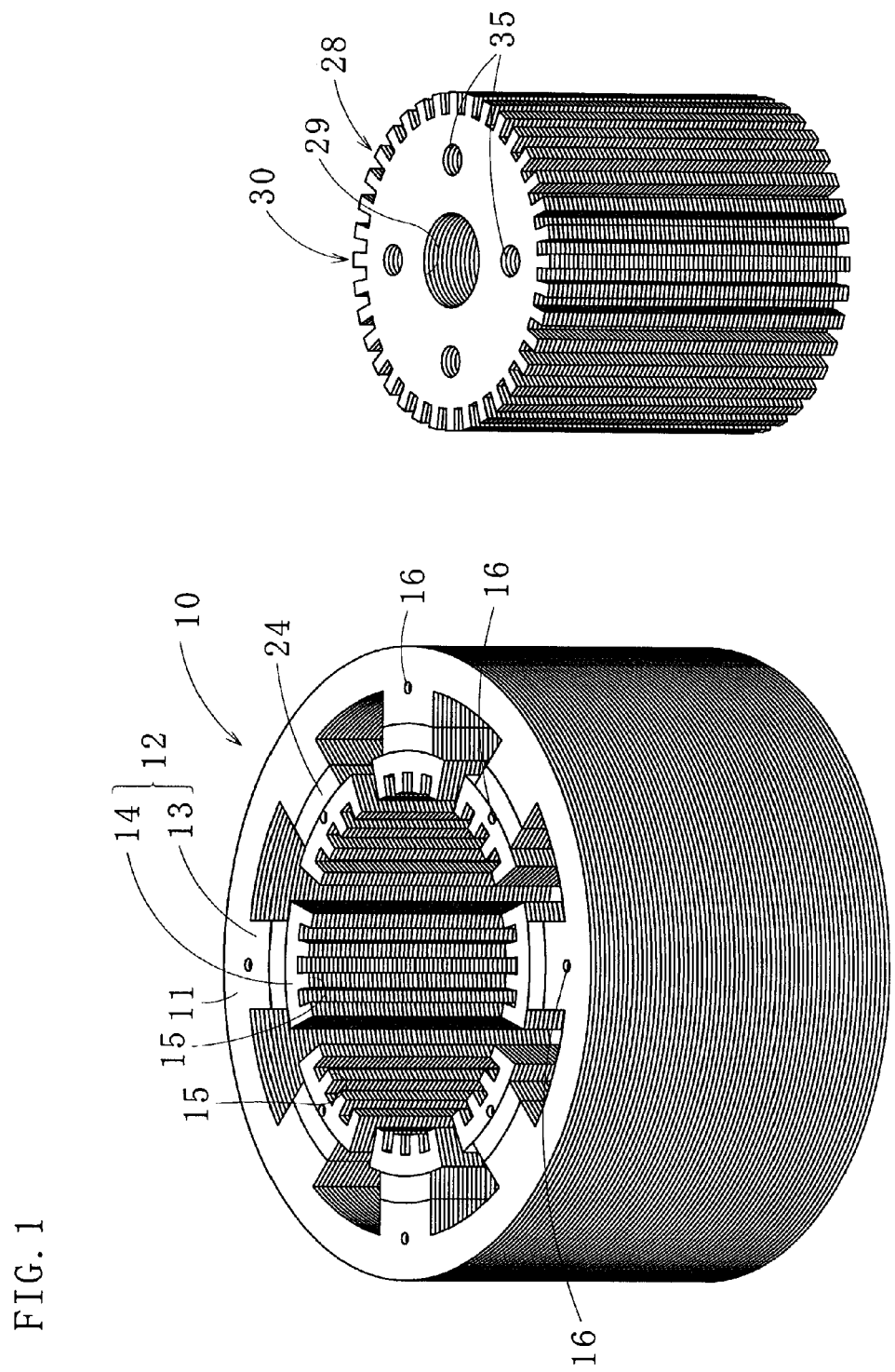
FIG. 1 shows perspective views of a stator core according to one embodiment of the present invention and a rotor core forming a pair with the stator core, respectively.

As shown in FIG. 1, a stator core 10 according to one embodiment of the present invention, which is used for a stepping motor, includes a ring-shaped yoke 11 and a plurality of magnetic poles 12 formed inside the yoke 11. The magnetic pole 12 includes a winding 13 and magnetic pole teeth 14 formed radially inside the winding 13. The magnetic pole teeth 14 include a plurality of small teeth 15 radially inside thereof.

The stator core 10 is formed by laminating a plurality of stator core sheets 17 (see FIG. 2) and interlocking the laminated stator core sheets 17 through interlocking portions 16. The stator core sheet 17 and the stator core 10 have the same shape when viewed from above. The stator core sheet 17 includes a yoke piece 18 in a circumferential area thereof and a plurality of magnetic pole pieces 19 inside the yoke piece 18. The magnetic pole piece 19 includes a straight piece 20 and a magnetic pole teeth piece 21 formed radially inside the straight piece 20. The straight pieces 20 are laminated to form the winding 13. The magnetic pole teeth piece 21 includes small teeth 22 inside thereof.

Figure 2A:
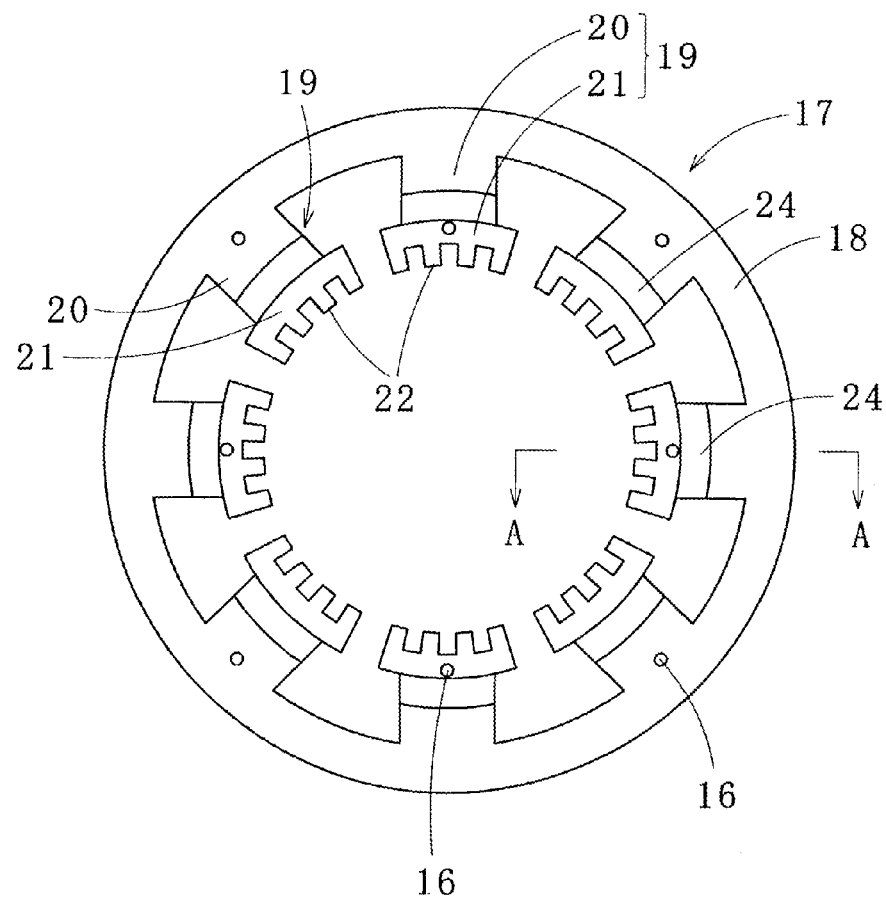
FIG. 2 (A) is a plan view of a stator core sheet for the stator core.
Figure 2B:
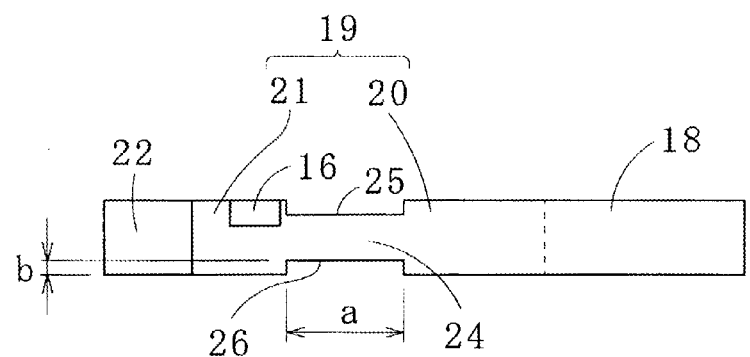

As shown in FIGS. 2 (A) and 2 (B), the straight piece 20 of the magnetic pole piece 19 includes a thin section 24. To form the thin section 24, both surfaces of the straight piece 20 perfectly aligned (overlapped) in a thickness direction are pressed from both sides of the straight piece 20 in a thickness direction. The thin section 24 includes grooves 25, 26, each having a rectangular cross-section, in upper and lower sides thereof. The grooves 25, 26 have the same shape. A depth "b" of the groove 25 (26) is 2-20% of a material thickness (e.g., 0.5 mm), and a width "a" of the groove 25 (26) is approximately one to six times the material thickness.

The interlocking portion 16 may be half-pressed or V-shaped. In this embodiment, the thin section 24 is formed in a radially inward area of the straight piece 20, but can be formed in a center or a radially outward area of the straight piece 20.

FIG. 1 shows a rotor core 28, which forms a pair with the stator core 10. The rotor core 28 includes a shaft hole 29 in its center and multiple teeth 30 in its circumferential area. There is a minimal gap between edges of the teeth 30 and the small teeth 15 of the stator core 10, enabling the rotor core 28 to rotate inside the stator core 10.

Figure 3:
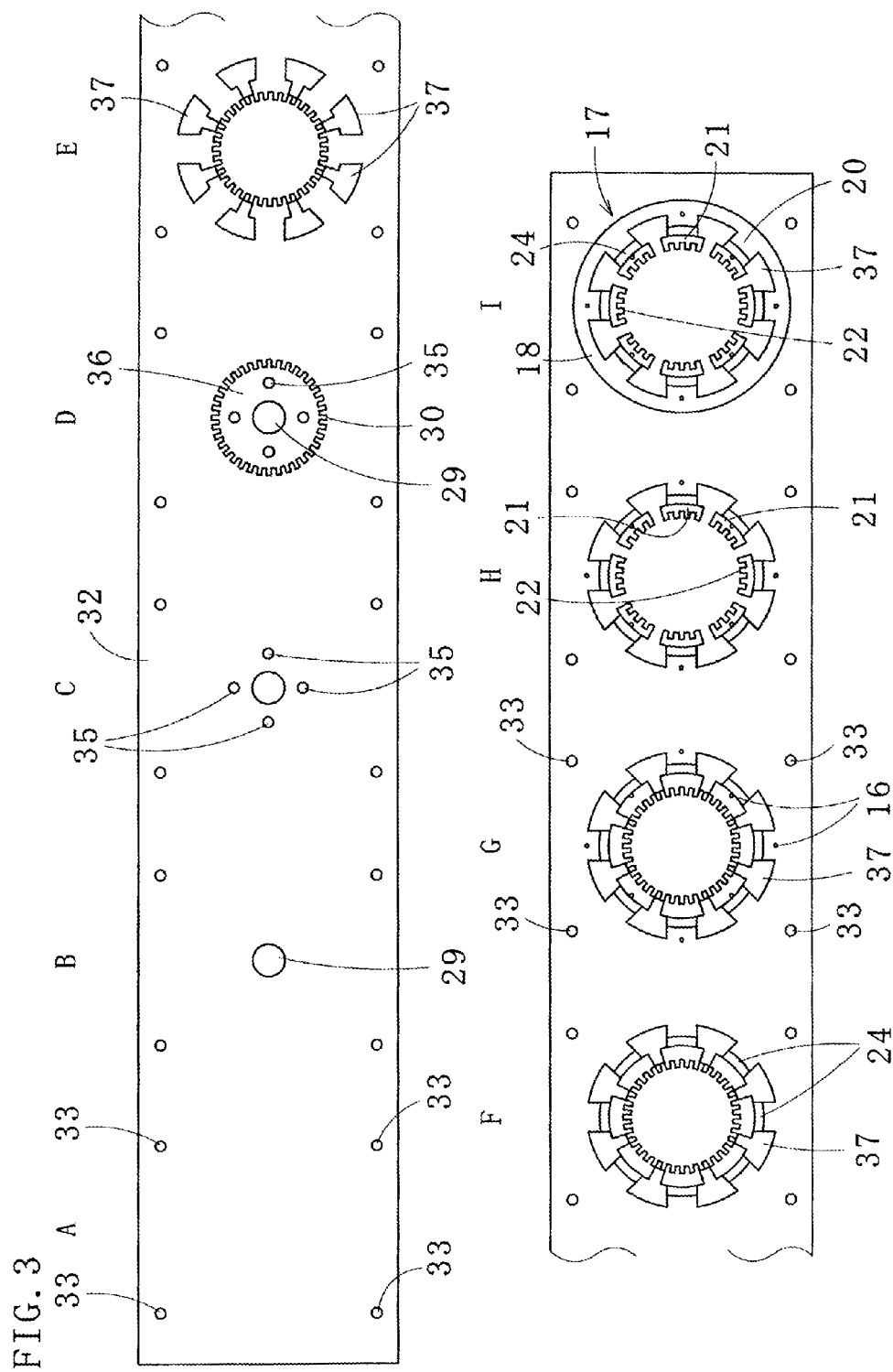
FIG. 3 is a process chart of a method for manufacturing a stator core according to one embodiment of the present invention.
Figure 4A:
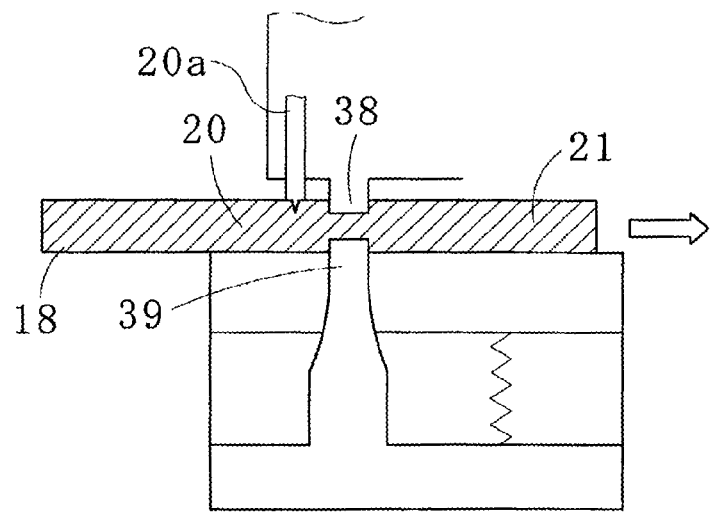
FIG. 4 (A) is an explanatory view of one station in the method for manufacturing the stator core.
Figure 4B:
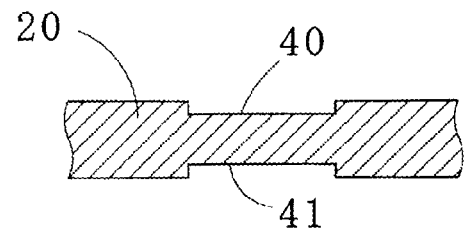
Figure 4C:
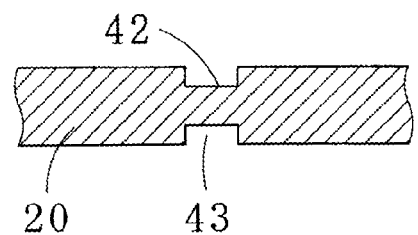
Figure 4D:
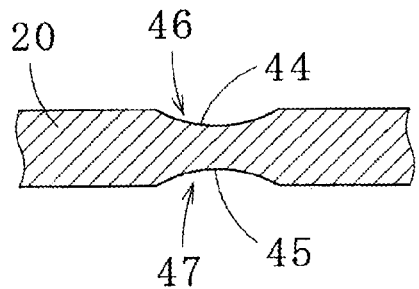

Referring to FIG. 3, a description will be given on a method for manufacturing a stator core according to one embodiment of the present invention.

As shown in FIG. 3, a manufacturing device for the stator core, using the method for manufacturing the stator core according to one embodiment of the present invention, has stations A-I. In the station A, pilot holes 33 are formed in a long magnetic metal sheet 32 having a thickness of, for example, approximately 0.3-1.0 mm. In the station B, the magnetic metal sheet 32 is positioned with the four pilot holes 33, and the shaft hole 29 is formed therein.

In the station C, interlocking portions 35 are formed around the shaft hole 29. In the station D, a rotor core sheet 36 is punched out along its outline. The rotor core sheets 36 are laminated inside the die to form the rotor core 28. In the station E, slots 37 are punched out of the magnetic metal sheet 32, a center of which has been previously blanked to form the rotor core sheet 36. Each of the slots 37 defines an outline of the magnetic pole piece 19 of the stator core sheet 17. Further in the station F, the straight pieces 20 each forming the magnetic pole piece 19 are partly pressed (coined) to form the thin sections 24. In this embodiment, the thin sections 24 each having a circular arc shape are located on the same circle as a whole, but the thin section 24 may have a straight shape. The rotor core sheet 36 and the stator core sheet 17 are formed concentrically.

FIG. 4 (A) shows how to form the thin section 24. The straight piece 20 is pressed by punches (projecting dies) 38, 39 from top and bottom to form the grooves 25, 26 having predetermined width and depth. By this presswork, the straight piece 20 extends in a radially inward direction because a radially outward side of the straight piece 20 is fixed by the yoke piece 18. As shown in FIG. 4 (A), for example, the material (magnetic metal sheet) may be fixed and pressed on the die with a V-shaped (wedge-shaped) ring 20a to improve the ductility of the material. This technique is similar to fine blanking. Obviously, it is possible to omit the V-shaped ring 20a.

With the punches operable to press (coin) the same portion of the straight piece 20 from top and bottom, it is possible to form wide grooves 40, 41 as shown in FIG. 4 (B) or narrow grooves 42, 43 as shown in FIG. 4 (C). It is also possible to form grooves 46, 47, bottoms 44, 45 of which each have a circular arc cross-section as shown in FIG. 4 (D). If a layout of a die device does not allow the use of punches having wide widths, the wide grooves can be formed by pressing the material multiple times with small punches (e.g., punches having narrow widths).

An extending length L of the magnetic pole piece 19 is approximately proportional to a total volume of upper and lower grooves, i.e., a product of "a total cross-sectional area of the upper and lower grooves" and "a width of the grooves." The grooves with deeper depths and the thin section with thinner thickness increase magnetic resistance and deteriorate magnetic characteristics of the stator core 10. Thus, the shapes of the upper and lower grooves are carefully designed in view of the total cross-sectional area of the upper and lower grooves and the thickness of the thin section.

In the station G, the necessary interlocking portions 16 are formed in the straight pieces 20 and the magnetic pole teeth pieces 21. The interlocking portions 16 may be formed in the yoke piece 18.

In the station H, inner portions of the magnetic pole pieces 19 are punched out to form the magnetic pole teeth pieces 21. The magnetic pole piece 19 is elongated radially inward, thus the magnetic pole teeth piece 21 having the small teeth 22 can be formed further radially inward. In the station I, the stator core sheet 17 is punched out along its outline. The stator core sheets 17 are laminated and interlocked inside the die to manufacture the stator core 10.

EXPERIMENTAL EXAMPLE

Figure 5A:
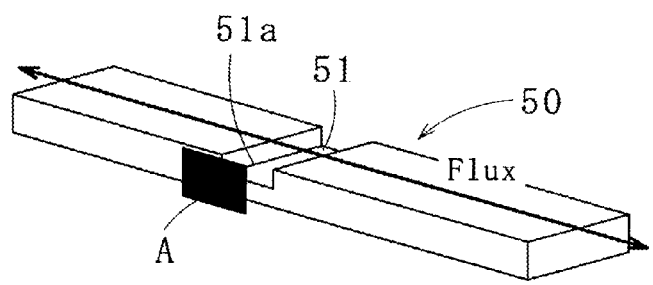
FIGS. 5 (A) and 5 (B) are explanatory views of test pieces used to examine functions and effects of the stator core according to the present invention.
Figure 5B:
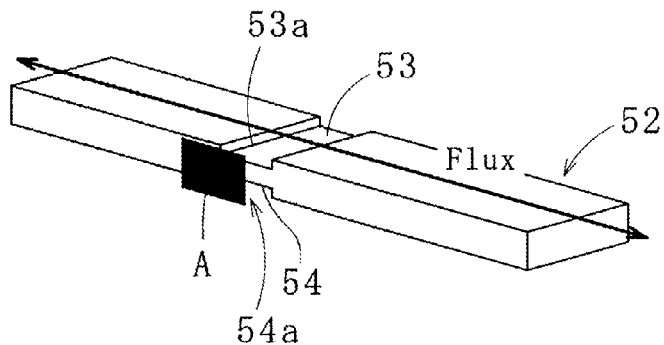
Figure 6:
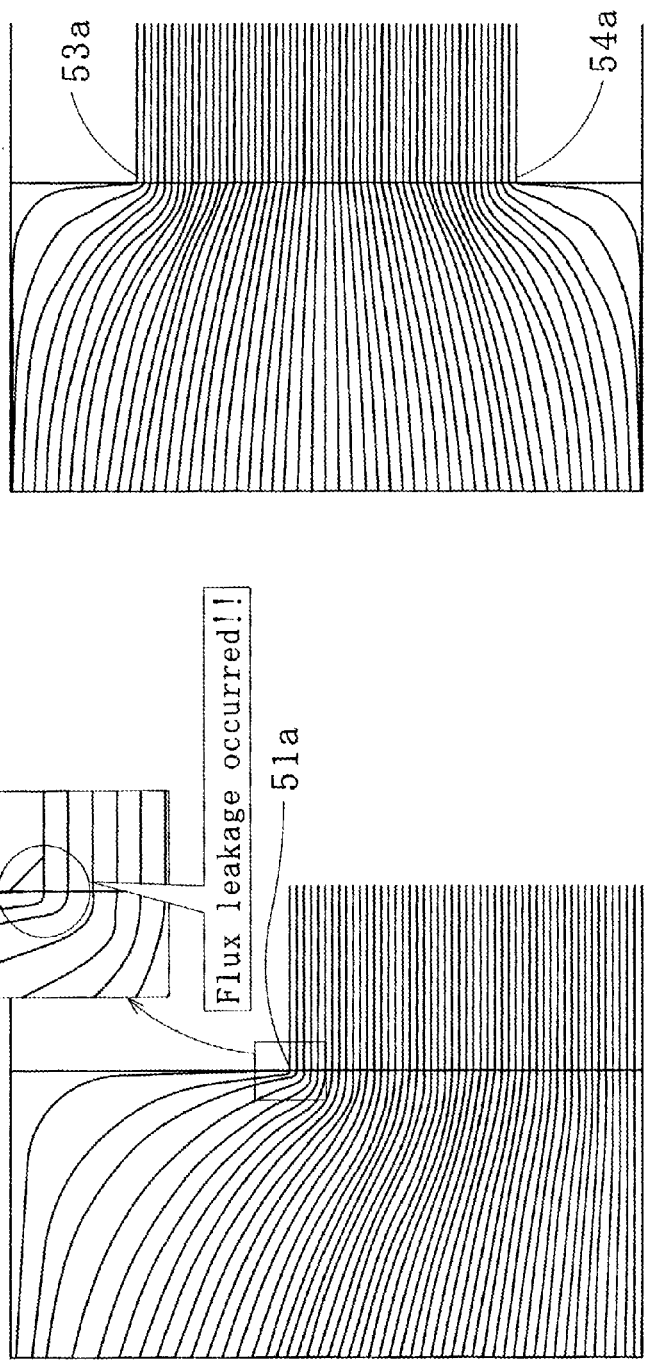
FIG. 6 shows explanatory views of flux flows in core sheets according to a conventional example and an experimental example.

Referring to FIG. 5 and FIG. 6, a supplemental explanation will be given on functions and effects of the method of manufacturing the stator core according to the present invention.

A test piece in FIG. 5 (A) is a core sheet (magnetic steel plate) 50 having a groove 51 in a center of one side thereof. The core sheet 50 has a length of 120 mm, a width of 30 mm, and a thickness of 0.5 mm. The groove 51 has a width of 1 mm and a depth of 0.225 mm. A test piece in FIG. 5 (B) is a core sheet 52 having grooves 53, 54 in a center of both sides thereof. The core sheet 52 is the same material as the core sheet 50 and has a length of 120 mm, a width of 30 mm, and a thickness of 0.5 mm The grooves 53, 54 each have a width of 1 mm and a depth of 0.1125 mm FIG. 6 shows flux flows of the core sheets 50, 52 when viewed from positions of rectangles A as shown in FIGS. 5 (A) and 5 (B). Numerals 51a, 53a, and 54a show corners of the grooves 51, 53, and 54, respectively.

FIG. 6 shows the flux flows of the core sheets 50, 52 based on a magnetic field analysis. In the analysis, the magnetic field of 50 Hz and 224 A/m is applied to the core sheets 50, 52. In the core sheet 50, the fluxes had to be bent drastically at the corner 51a of the groove 51, which caused a leakage of the fluxes and accordingly reduced the flowing fluxes. In the core sheet 52, a flux leakage did not occur at the corners 53a, 54a of the groove 53, 54. As a result, a flux content of the core sheet 50 was less than that of the core sheet 52 by 0.2 T, and thus the magnetic characteristics of the core sheet 52 having the grooves 53, 54 at both sides were better improved.

The present invention is not limited to the above-described embodiment, but the number of magnetic poles and the shape of the magnetic teeth can be modified without departing from the scope of the present invention. In the above-described embodiment, the thin section is formed by pressing one portion of the magnetic pole piece from the both sides in the thickness direction. Alternatively, the thin section can be formed by pressing different portions (including a partly overlapped area) of the magnetic pole piece from the both sides in the thickness direction.

Industrial Applicability

In the stator core and the method of manufacturing the same according to the present invention, the thin section is formed by pressing the same portion or the different portions of the magnetic pole piece of the stator core sheet from the both sides in the thickness direction, and the magnetic pole piece is uniformly elongated radially inward. This provides the magnetic pole piece a more effective area for presswork, allowing a stator core sheet to be manufactured with better precision. In the process of forming the thin section, pressing both sides of the magnetic pole piece in the thickness direction enables the magnetic pole piece to be elongated longer in a radially inward direction without changing the magnetic characteristics, compared to pressing one side thereof. In short, by pressing the both sides, a more effective motor can be manufactured.

Description of Numerals

10: stator core; 11: yoke; 12: magnetic pole; 13: winding; 14: magnetic pole teeth; 15: small tooth; 16: interlocking portion; 17: stator core sheet; 18: yoke piece; 19: magnetic pole piece; 20: straight piece; 20a: V-shaped ring; 21: magnetic pole teeth piece; 22: small tooth; 24: thin section; 25, 26: groove; 28: rotor core; 29: shaft hole; 30: tooth; 32: magnetic metal sheet; 33: pilot hole; 35: interlocking portion; 36: rotor core sheet; 37: slot; 38, 39: punch; 40-43: groove; 44, 45: bottom of groove; 46, 47: groove; 50: core sheet; 51: groove; 51a: corner; 52: core sheet; 53, 54: groove; 53a, 54a: corner

The invention claimed is:

1. A stator core including laminated stator core sheets, each of the stator core sheets punched out from a magnetic metal sheet, a central portion of the magnetic metal sheet previously punched out to form a rotor core sheet, the stator core sheet having a ring-shaped yoke piece and magnetic pole pieces formed radially inside the yoke piece, each of the magnetic pole pieces having a straight piece and a magnetic pole teeth piece formed radially inside the straight piece, the stator core comprising:
a thin section formed in each of the straight pieces, the thin section formed by pressing one portion of the magnetic pole piece from both sides in a thickness direction, forming grooves having the same rectangular cross-sectional shape at both sides in a thickness direction of the thin section, depths of the grooves being within a range of 2-20% of a thickness of the magnetic pole piece, and radially-inwardly elongating the magnetic pole piece.

2. The stator core as defined in claim 1, wherein a width of the groove is within a range of one to six times a thickness of the magnetic pole piece.

3. A method of manufacturing a stator core formed by laminating stator core sheets, each of the stator core sheets punched out from a magnetic metal sheet, a central portion of the magnetic metal sheet previously punched out to form a rotor core sheet, the stator core sheet having a ring-shaped yoke piece and magnetic pole pieces formed radially inside the yoke piece, each of the magnetic pole pieces having a straight piece and a magnetic pole teeth piece formed radially inside the straight piece, the method comprising the steps of
pressing one portion of the straight piece from both sides in a thickness direction to form a thin section;
forming grooves at both sides in a thickness direction of the thin section, the grooves having the same rectangular cross-sectional shape, depths of the grooves being within a range of 2-20% of a thickness of the magnetic pole piece; and
radially-inwardly elongating the magnetic pole piece by a predetermined length.

4. The method of manufacturing the stator core as defined in claim 3, wherein a width of the groove is within a range of one to six times a thickness of the magnetic pole piece.

* * * * *